Oct. 3, 1944. C. F. GREINER 2,359,519
ROAD ROLLER
Filed Nov. 23, 1942 2 Sheets-Sheet 2
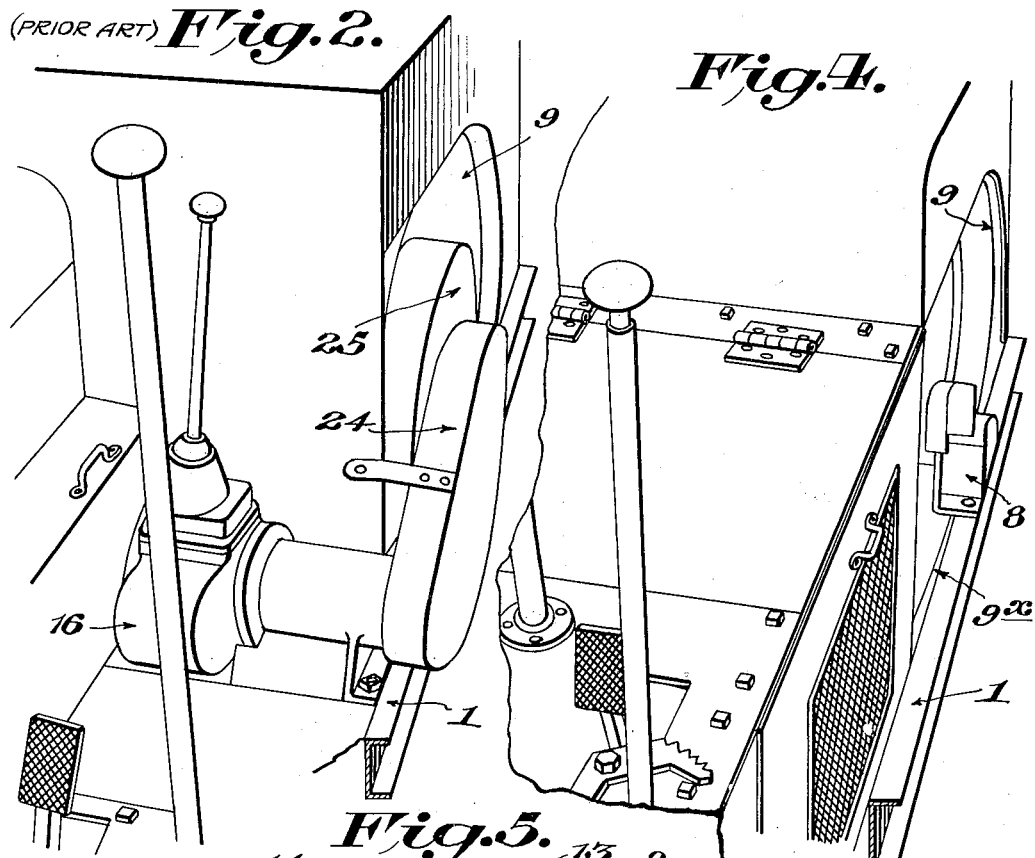
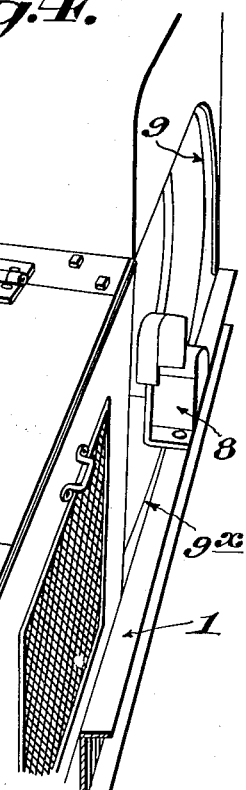
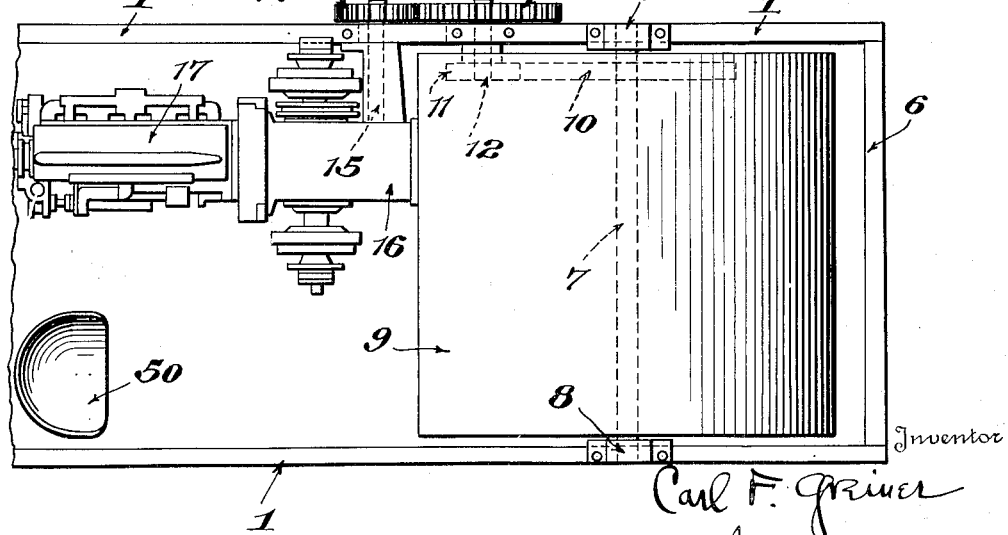

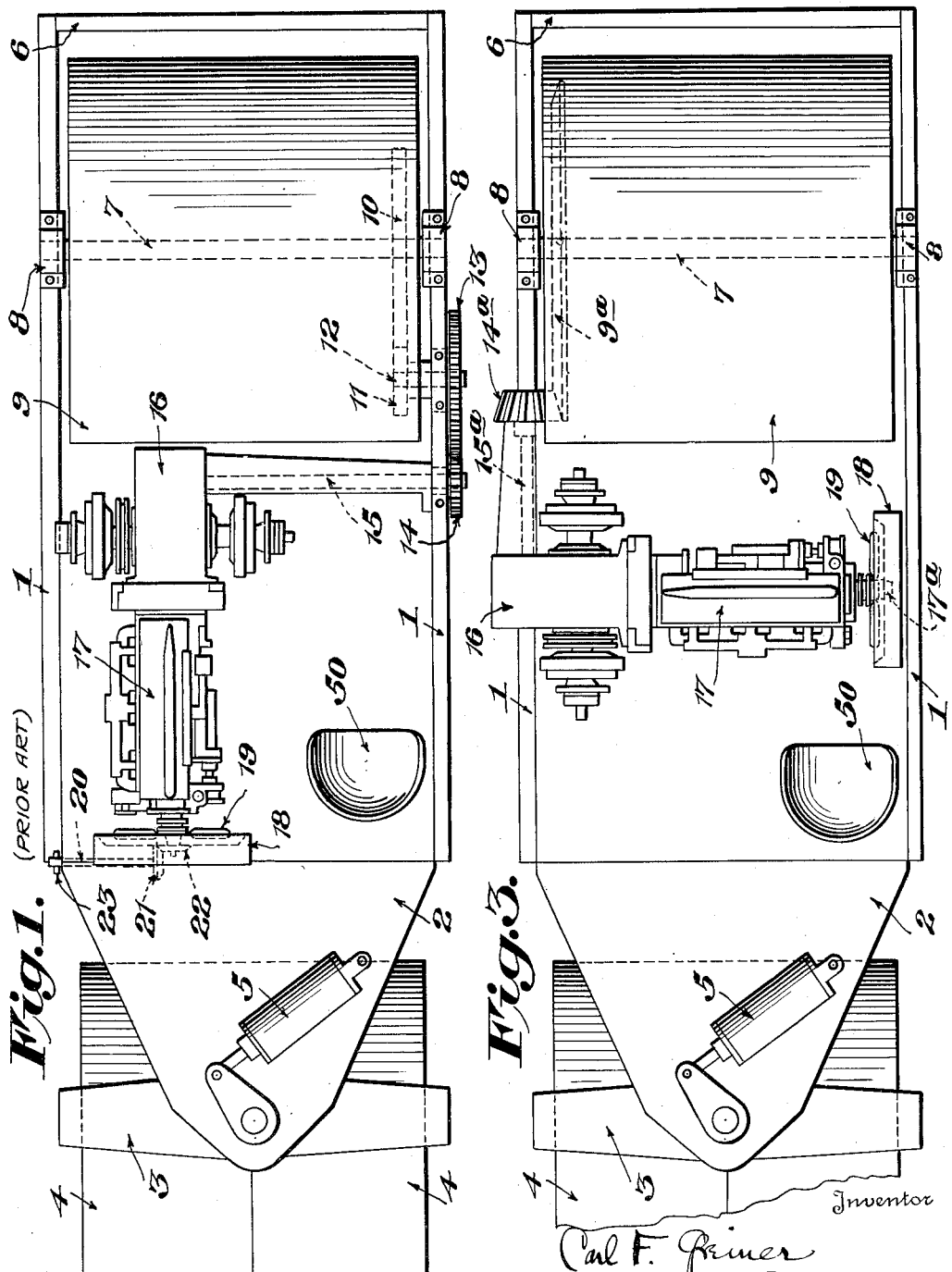

Patented Oct. 3, 1944

2,359,519

UNITED STATES PATENT OFFICE 2,359,519

ROAD ROLLER

Carl F. Greiner, Springfield, Ohio, assignor to The Buffalo-Springfield Roller Co., Springfield, Ohio, a corporation of Ohio Application November 23, 1942, Serial No. 466,649

3 Claims. (Cl. 180—20)

This invention is a novel improvement in road rollers, particularly of the tandem type, the present application being a continuation-in-part of my co-pending application Serial No. 364,735, filed November 7, 1940. Said application has since become abandoned.

It has generally been customary in tandem road rollers to place the operator on a seat adjacent the steering roll of the road roller but facing the drive roll, said seat being usually disposed on the operator's side of the machine when looking from the operator's seat toward the said drive roll, such arrangement being for the purpose of permitting the operator to better judge for convenience in the road rolling operations, the position of the near end of the drive roll in relation to curbs, roadside obstructions, or the like.

The principal object of my present invention is to provide a novel arrangement retaining the normal positioning of the operator's seat at the same side of the machine, but disposing the final spur gear or bevel gear drive from the transmission to the said drive roll at the opposite side of the frame, when looking from the driver's seat towards the drive roll, such arrangement permitting unobstructed view by the operator of the point of contact of the drive roll with the ground surface at the near end of the drive roll while undergoing rolling operations adjacent curbs or obstructions disposed at the operator's side of the frame. Thus my novel arrangement retains the normal positioning of the driver's seat while it disposes at the opposite side of the frame the final spur or bevel gear driving of the transmission to the driving roll, and therefore provides a novel arrangement possessing definite advantages over the arrangements of said parts in tandem rollers heretofore used.

Another object of my invention is to provide a road roller of the above type having a frame supported by a drive roll journaled on an axle in the frame and supported also by a steering roll, said frame carrying an engine and multiple speed transmission assembly arranged as a substantially L-shaped unit so that all of the gears thereof, except the main gear on the drive roll and its driving pinion may be enclosed in housings and may run in oil, the engine and transmission unit being so arranged that the axis of the engine and transmission is disposed transversely of the frame of the road roller, and with said unit lying substantially entirely within the limit of the width of the roller frame except the said driving pinion, thereby providing a road roller embodying the features of ease and simplicity of construction; also a road roller in which the radiator of the engine is disposed edgewise with respect to the movement of the frame and at one side of the roller frame so that dust and dirt raised by the steering roll will not be directed through or drawn through the radiator; also a road roller in which the axis of the engine is disposed transversely of the road roller frame thereby allowing for direct cranking of the engine shaft from the side of the road roller frame.

Heretofore road rollers of the above type have been provided with engines and transmissions disposed parallel with the axis of the road roller, and the radiator of the engine being disposed transversely of the motor frame would draw in dust and dirt raised by the rolls, thereby in a short time affecting the efficiency of the radiator owing to deposits of dust therein. Moreover, in rollers in which the engine is disposed parallel with the axis of the road roller frame it is not possible to utilize the customary starting crank applied directly to the engine shaft for starting the engine, but such arrangement necessitates the provision of shafting and gearing extending from the engine shaft to the side of the road roller frame to which the usual hand crank could be applied, thereby increasing the cost of road rollers. Moreover, in such road rollers in which the engine and transmission were disposed parallel with the axis of the roller frame, usually four reducing spur gears are required in transmitting the power from the transmission shaft to the drive axle of the drive roll, which spur gears were open to accumulations of dirt and grit, and could not readily be made to run in oil, whereby the teeth of said spur gears would rapidly deteriorate.

My novel road roller having the engine and the transmission assembly disposed transversely of the roller frame eliminates the necessity of extraneous shafting and gearing extending to the side of the frame in order to accommodate the starting crank of the engine; and moreover disposes the radiator edgewise on the frame so that accumulations of dust and dirt are not drawn therethrough; and moreover eliminates the necessity of providing an open spur gear train of reducing gears between the transmission shaft and drive axle of the drive roll; and moreover provides a construction in which all of the driving gears and shafts, except the main drive gear on the side of the drive roll and its meshing drive pinion on the transmission shaft, are all enclosed and run in oil.

Other minor objects of the invention will be hereinafter set forth.

I will explain the invention with reference to the accompanying drawings which illustrate several practical embodiments thereof to enable others familiar with the art to adopt and use the same; and will summarize in the claims the novel features of construction and novel combinations of parts for which protection is desired.

In said drawings:

Fig. 1 is a top plan view of a road roller of the tandem type showing the prior art arrangement of engine and transmission assembly disposed parallel with the axis of the road roller, and showing the operator's seat and final spur gear drive both disposed at the operator's side of the frame.

Fig. 2 is a perspective view taken from the operator's seat of the prior art machine shown in Fig. 1 looking downwardly at the operator's side of the road roller towards the point of contact of the drive roll with the ground surface, said view clearly showing the housings for the final spur gear drive so obstructing the vision of the operator that he is prevented from seeing the said point of contact.

Fig. 3 is a top plan view of my novel road roller of the same tandem type, showing one novel arrangement of the engine and transmission assembly unit (with the engine and transmission housing removed) which unit directly drives the drive roll by means of a bevel pinion disposed at the side of the frame opposite from the operator's seat.

Fig. 4 is a perspective view looking downwardly from the operator's seat (of the road roller shown in Fig. 3) at the operator's side of the frame towards the point of contact of the drive roll with the ground surface, and clearly showing that said point of contact is readily visible in an unobstructed manner to the operator seated in the operator's seat at the operator's side of the frame.

Fig. 5 is a view showing a modified arrangement utilizing a spur gear final drive similar to that shown in the prior art arrangement, Fig. 1, but showing said final spur gear drive disposed at the side of the frame opposite from the operator's seat.

The road rollers shown in the drawings are of tandem type, having side frames 1, 1, connected at their converging ends by a goose-neck casting 2 carrying the trunnions of the yoke 3 of the steering roll 4, said yoke being usually actuated by an hydraulic cylinder 5. The opposite ends of the side frames 1 are connected together by a frame member 6, and between the frames 1, 1 is an axle 7 journaled in bearings 8 mounted on the side frames 1, said axle carrying the drive roll 9 in the usual manner.

In the prior art arrangement shown in Fig. 1, a operator's seat 50 is mounted on the frame at the operator's side thereof looking towards the drive roll 9, and customarily the drive axle 7 at the operator's side of the frame is provided with a large spur gear 10 meshing with a small spur gear 11 carried by a stub shaft 12 journaled in the adjacent side frame 1, said stub shaft 12 also carrying a large spur gear 13 meshing with a small spur gear 14 mounted on the axle 15 of the multiple speed transmission 16, which transmission is disposed parallel with the axis of the road roller adjacent the side of the frame opposite from the operator's seat and is directly coupled with the prime mover 17 which usually comprises an internal combustion engine whose axis is also disposed parallel with the axis of the road roller frame adjacent the side opposite from the operator's seat 50.

Associated with motor 17 is the customary radiator 18 and fan 19, the radiator being disposed transversely of the axis of the road roller frame. With an arrangement such as shown in Fig. 1 it is impractical to provide the usual hand crank for starting the engine, which crank engages the end of the engine shaft, owing to the shape of the goose-neck casting 2, and even if a hand crank was provided it would be necessary for the operator to mount the road roller in order to crank or start the engine. Therefore the road roller arrangement shown in Fig. 1 is customarily provided with an auxiliary shaft 20 carrying a bevel pinion 21 meshing with a similar pinion 22 mounted directly on the engine shaft, said auxiliary shaft 20 extending to one side of the road roller frame, and being provided with the usual pin 23 for engagement with the hand crank (not shown) so that the operator can conveniently start the motor from said side of the road roller.

Moreover, in road rollers arranged as shown in Fig. 1, the radiator 18 is so positioned that dust raised by the rolls will be drawn directly and freely through the radiator, necessitating frequent cleansing of the dirt therefrom in order to maintain proper efficiency.

In the prior art arrangement shown in Fig. 1 the main drive spur gears 10, 11, 13 and 14 are often exposed to dust and dirt since same cannot be conveniently housed in an oil-tight casing so as to run in oil, and accumulations of dirt soon deteriorate said spur gears so that replacements are frequently necessary. In Fig. 1 the gears 10, 11, 13 and 14 are shown exposed. However, these gears are sometimes covered with guard housings such as 24 and 25, Fig. 2, which serve merely as guards rather than lubricant retaining casings. But with the final spur gear drive arrangement 10, 11, 13 and 14 shown in Fig. 1, irrespective of whether or not the guard housings 24 and 25 are or are not provided, it is impossible for the operator when seated in seat 50 to look downwardly at the adjacent side of the road roller and see the point of contact of the near end of the drive roll 9 with the ground surface, his vision being definitely obstructed by the gears or by the housings as shown in Fig. 2, in consequence of which the operator must necessarily merely guess the distance between the near end of drive roll 9 and the street curbing or other fixed obstruction during rolling operations. Thus the presence of the gears 10, 11, 13, 14 or of the housings 24, 25 present a definite hindrance to ready operation of the road roller, particularly when operating adjacent curbs or other obstructions disposed adjacent the operator's side of the frame since said housings 24, 25 or gears 10, 11, 13 and 14 are directly in the operator's line of vision, and since the gears or their housings extend beyond the adjacent side member 1 of the frame as clearly shown in Fig. 2.

One embodiment of my novel improvement is illustrated in Figs. 3 and 4 which shows a modified arrangement of engine and transmission assembly unit on the road roller frame, and such parts in Fig. 3 which are similar to those in Fig. 1 bear the same reference characters. According to Fig. 3 the operator's seat 50 is disposed at the operator's side of the frame. The engine 17 and multiple speed transmission 16 however are assembled as a unit on an axis disposed transversely of the road roller, and are so designed that their overall length will fit within the limits of the width of the road roller frame with the exception of the housing for the transmission shaft 15a which is disposed substantially directly above the frame member 1 of the road roller at the side opposite from the operator's seat and carries a bevel pinion 14a which meshes with a large bevel ring gear 9a on the adjacent end of the drive roll 9.

In the modification shown in Figs. 3 and 4 the exposed spur gears 14, 13, 11 and 10 of Fig. 2, together with the stub shaft 12, are replaced by a single exposed bevel pinion 14a of the transmission meshing with the bevel gear 9a on the drive roll 9, and all other reducing gears in the transmission and also the engine shaft are entirely enclosed so that same may run directly in oil, thereby providing proper lubrication while protecting the reducing gears from dirt, grit, or the like. Also, the engine shaft 17a terminates adjacent one side frame of the road roller, and may be engaged directly with the usual hand crank (not shown) so that the motor may be readily started from the side of the roller, without necessitating the use of the shaft 20 and gears 21 and 22 shown in Fig. 2. Moreover, the radiator 18 is disposed edgewise with respect to the movement of the road roller and is thus so positioned that dust and dirt raised by the front roll 4 will largely be prevented from being drawn through the radiator; and thus the efficiency of the radiator will be maintained for long periods.

In the modification shown in Figs. 3 and 4, the operator's seat 50 is similarly disposed at the operator's side of the frame. However, the final bevel gear drive 14a, 9a, is disposed at the opposite side of the machine, and thus the operator while seated in seat 50 may look downwardly at the adjacent side of the machine and may directly see the point of contact indicated at 9x in Fig. 4 of the drive roll 9 with the ground surface, his line of vision being unobstructed by gearings or housings such as those shown in Fig. 2, and thus the operator may clearly see the distance between the near end of drive roll 9 from the curbing or other obstruction adjacent the operator's side of the machine during rolling operations. The above feature of clear vision is very important since it lessens the danger of injury, during rolling operations, to curbing or other objects in close proximity to drive roll 9, and moreover greatly facilitates the ease with which said rolling operations may be performed, since it dispenses with the necessity of the operator having to dismount from the road roller in order to ascertain the approximate distance between the near end of the drive roll and any fixed ground objects, thus saving time and unnecessary work on the part of the operator.

In the modification shown in Fig. 5 an arrangement is shown which is generally similar to Fig. 1, and similar parts in Figs. 1 and 5 are similarly lettered. In this modification, however, the driver's seat is likewise disposed at the operator's side of the frame; and a final spur gear drive 10, 11, 13 and 14 is provided which is substantially identical in all respects with that shown in Fig. 1 with the exception that drive shaft 15 of transmission 16 extends outwardly beyond the opposite side of the frame instead of the right hand side of the frame (as in Fig. 1) so that the final spur gear drive 10, 11, 13, 14 with or without the guard housings 24, 25 is disposed at the side of the frame opposite from the operator's seat 50, thus enabling the operator to look downwardly at the adjacent side of the frame without obstruction by the gears 10, 11, 13, 14 or the housings 24, 25, in order to clearly see the point of contact of the right hand end of the drive roll 9 with the ground surface 9x (Fig. 4) in the same manner illustrated in connection with Fig. 4.

Thus, regardless of whether the final drive from the transmission to the drive roll is through bevel gears or spur gears, my arrangement will permit an unobstructed view by the operator, seated at the operator's side of the frame, to the point of contact of the adjacent end of the drive roll 9 with the ground surface, and without necessitating the driver at any time having to dismount from the machine to ascertain the approximate clearance between the adjacent end of the drive roll and other objects such as curbings or fixed obstructions.

My above construction provides a road roller embodying as main features ease of operation, and cheapness of manufacture and maintenance; and I do not limit my invention to the exact forms shown in the drawings, for obviously changes may be made therein within the scope of the claims.

I claim:

1. A road roller of the tandem type including a frame supported by a drive roll carrying a gear, and including a steering roll and including an operator's seat facing the drive roll and disposed adjacent one side of the frame; an engine and transmission unit on the frame intermediate the rolls, said transmission including a drive shaft; and intermeshing gearing connecting the drive shaft and said drive roll gear; said intermeshing gearing being disposed at the opposite side of the frame from the operator's seat thereby permitting unobstructed view from the operator's seat during rolling operations of the near end of the drive roll with respect to curbs or other ground obstructions disposed at the same side of the frame as said seat.

2. A road roller of the tandem type including a frame supported by a drive roll and a steering roll and including an operator's seat facing the drive roll and disposed adjacent one side of the frame; an engine and transmission unit on the frame intermediate the rolls the transmission having its longitudinal axis aligned with the main shaft of the engine, and said unit being disposed transversely of and substantially within the limits of the width of the frame; said transmission including a drive shaft disposed axially of the frame adjacent the said opposite side of the frame; a bevel gear on the end of the driving roll adjacent the drive shaft; and a bevel pinion on the drive shaft engaging said gear, said positioning of the drive shaft permitting unobstructed view from the operator's seat during rolling operations of the near end of the drive roll with respect to curbs or other ground obstructions disposed at the same side of the frame as said seat.

3. A road roller of the tandem type having a frame supported by a driving roll and a steering roll and including an operator's seat facing the drive roll and disposed adjacent one side of the frame; an engine and transmission unit on the frame intermediate the rolls, said transmission having its longitudinal axis aligned with the main shaft of the engine, and said unit being disposed axially of the frame and adjacent the opposite side thereof from the driver's seat, said transmission including a drive shaft disposed transversely of the axis of the frame and extending beyond the said opposite side of the frame, a spur gear rotatable with the driving roll; a second spur gear on the drive shaft and an intermeshing spur gear train connecting said first and second spur gears and disposed adjacent said opposite side of the frame from the driver's seat, said positioning of the drive shaft and intermeshing spur gear train permitting unobstructed view from the operator's seat during rolling operations of the near end of the drive roll with respect to curbs or other ground obstructions disposed at the same side of the frame as said seat.

CARL F. GREINER.